United States Patent
Wozniak et al.

(10) Patent No.: US 9,050,903 B2
(45) Date of Patent: Jun. 9, 2015

(54) TORQUE CONTROL ARBITRATION IN POWERTRAIN SYSTEMS

(75) Inventors: Leonard G. Wozniak, Ann Arbor, MI (US); Robert C. Simon, Jr., Novi, MI (US); Christopher E. Whitney, Highland, MI (US); Donovan L. Dibble, Utica, MI (US); Charles H. Folkerts, Troy, MI (US); Joseph R. Dulzo, Novi, MI (US); Thomas Magnusson, Holo (SE); Magnus Wall, Trollhattan (SE); Emil Ritzen, Gunnebo (SE)

(73) Assignee: GM Global Technology Operations LLC, Detroit, MI (US)

( * ) Notice: Subject to any disclaimer, the term of this patent is extended or adjusted under 35 U.S.C. 154(b) by 2554 days.

(21) Appl. No.: 11/712,597

(22) Filed: Feb. 28, 2007

(65) Prior Publication Data

US 2008/0208420 A1    Aug. 28, 2008

(51) Int. Cl.
*H02P 27/04* (2006.01)
*H02P 23/00* (2006.01)
*B60L 15/20* (2006.01)
*B60L 9/00* (2006.01)

(52) U.S. Cl.
CPC . *B60L 15/20* (2013.01); *B60L 9/00* (2013.01); *Y02T 10/7275* (2013.01)

(58) Field of Classification Search
USPC ............ 701/51, 53, 70, 91, 84, 54; 180/65.2, 180/165, 65.1, 65.6; 477/3, 169, 7, 34; 475/5, 150, 204, 149; 903/902, 905, 903/906

See application file for complete search history.

(56) References Cited

U.S. PATENT DOCUMENTS

| | | | |
|---|---|---|---|
| 7,178,618 B2 * | 2/2007 | Komeda et al. | 180/65.275 |
| 7,412,317 B2 * | 8/2008 | Takamatsu et al. | 701/70 |
| 2003/0085062 A1 * | 5/2003 | Bowen | 180/65.1 |
| 2005/0060076 A1 | 3/2005 | Phillips et al. | |
| 2006/0030450 A1 * | 2/2006 | Kyle | 477/3 |
| 2006/0138995 A1 * | 6/2006 | Sugita et al. | 318/811 |
| 2008/0176705 A1 * | 7/2008 | Tamai et al. | 477/3 |

FOREIGN PATENT DOCUMENTS

| | | |
|---|---|---|
| CN | 1797934 A | 7/2006 |
| JP | 2006187090 A | 7/2006 |

* cited by examiner

*Primary Examiner* — Ronnie Mancho

(57) ABSTRACT

A method of regulating a torque output of a vehicle powertrain includes generating a plurality of torque requests and associating each of the plurality of torque requests with one of a plurality of arbitration domains to form torque request sets associated with each of the plurality of arbitration domains. A first torque request set is arbitrated within a first of the plurality of arbitration domains to provide a first torque request. The first torque request is introduced into a second torque request set associated with a second of the plurality of arbitration domains. The second torque request set is arbitrated within the second arbitration domain to provide a second torque request. A torque source is regulated based on the second torque request.

24 Claims, 4 Drawing Sheets

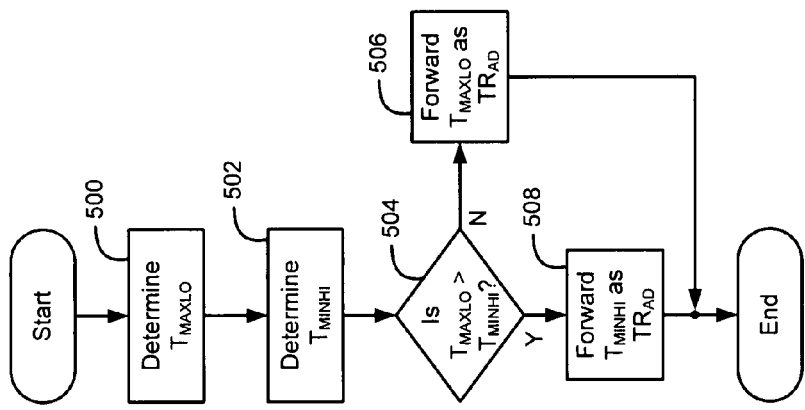
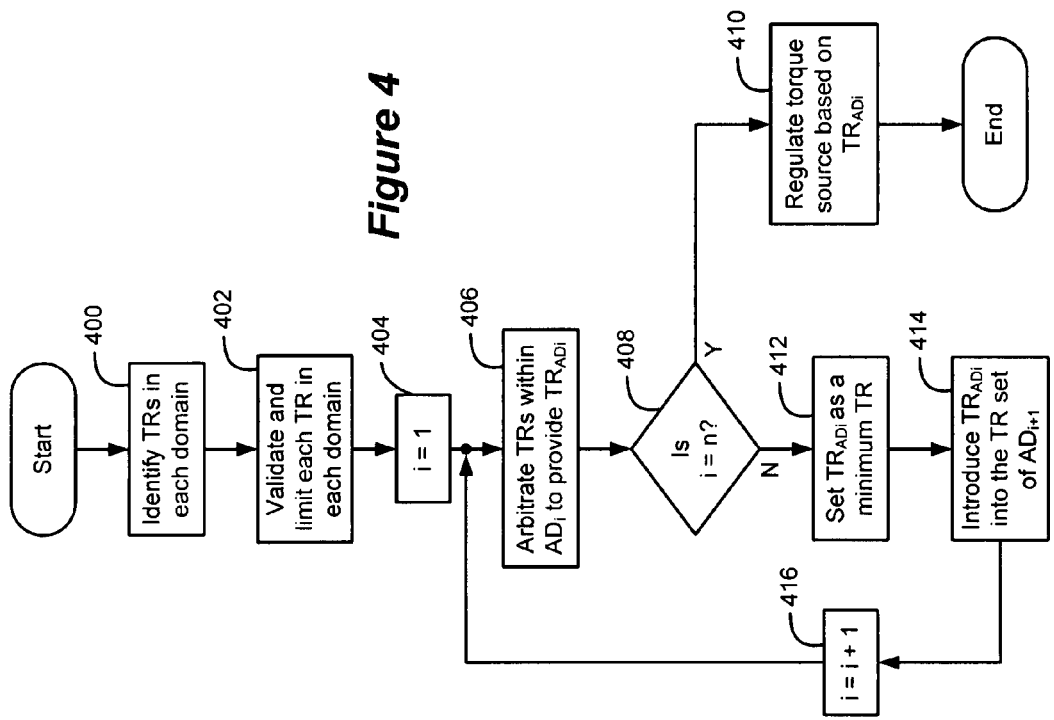

TORQUE CONTROL ARBITRATION IN POWERTRAIN SYSTEMS

FIELD

The present disclosure relates to torque control in a vehicle, and more particularly to torque control arbitration in powertrain systems.

BACKGROUND

The statements in this section merely provide background information related to the present disclosure and may not constitute prior art.

Vehicles typically include a powertrain system that generates drive torque and transfers the drive torque to driven wheels, which propel the vehicle along a surface. Powertrain systems come in various configurations and include various components. A traditional powertrain system includes a torque source, such as an internal combustion engine (ICE), a transmission that is coupled to the torque source and a driveline that is coupled to an output of the transmission. The driveline can be a front-wheel driveline (FWD), a rear-wheel driveline (RWD) or a four-wheel driveline (4WD), which typically also includes a transfer case. Some powertrain systems include multiple torque sources, such as is the case with a hybrid electric powertrain system, which includes an ICE and an electric motor/generator.

Powertrain systems also include several torque features, each of which seeks to influence the amount of drive torque at various points along the powertrain system. An upper level or global torque feature is a vehicle driver, who commands a desired output torque from the torque source(s) or a desired axle torque based on a driver input. Exemplary driver inputs include, but are not limited to, an accelerator pedal and a cruise control system. Modern powertrain systems include additional torque features such as vehicle stability control systems, traction control systems, engine overspeed protection systems, transmission shift quality systems, engine and/or transmission component protection systems and/or driveline component protection systems, among several others. The torque features can number in the tens to over a hundred, depending upon the particular configuration of the powertrain system.

The torque features of a particular powertrain system are independent and can often seek to control the drive torque at the same time. Because the powertrain system can only produce a single drive torque value at any time, an arbitration system is required to determine the correct drive torque to produce. Traditional powertrain systems are overly complex and seek to establish a hierarchy of desired torque behavior. Such traditional powertrain systems use one or two primary design methods. They either assign various priority levels to a torque request to enable arbitration based on priority or they rely on complex pre-defined interactions. Both of these methods result in complex systems and system behavior compromises.

SUMMARY

Accordingly, the present disclosure provides a method of regulating a torque output of a vehicle powertrain. The method includes generating a plurality of torque requests and associating each of the plurality of torque requests with one of a plurality of arbitration domains to form torque request sets associated with each of the plurality of arbitration domains. A first torque request set is arbitrated within a first of the plurality of arbitration domains to provide a first torque request. The first torque request is introduced into a second torque request set associated with a second of the plurality of arbitration domains. The second torque request set is arbitrated within the second arbitration domain to provide a second torque request. A torque source is regulated based on the second torque request.

In another feature, the steps of arbitrating include identifying a lowest maximum torque request within an arbitration domain and identifying a highest minimum torque request within the arbitration domain. A torque request output for the arbitration domain is set equal to the lower of the lowest maximum torque request and the highest minimum torque request.

In another feature, the step of introducing includes setting the first torque request equal to a minimum torque request.

In another feature, the torque requests include at least one of an absolute torque, a minimum torque limit, a maximum torque limit and a torque delta.

In still other features, the steps of arbitrating include identifying a lowest maximum torque request within an arbitration domain and identifying a highest minimum torque request within the arbitration domain. A torque request output for the arbitration domain is set equal to the lower of the lowest maximum torque request and the highest minimum torque request minus a torque delta request when the torque requests include torque delta requests. The torque delta request is a decreasing delta torque request and is the largest of all torque delta requests of the torque delta requests.

In yet other features, the steps of arbitrating include identifying a lowest maximum torque request within an arbitration domain and identifying a highest minimum torque request within the arbitration domain. A torque request output for the arbitration domain is set equal to the lower of the highest minimum torque request and the lowest maximum torque request plus a torque delta request when the torque requests include torque delta requests. The torque delta request is the largest increasing torque delta request when the delta torque requests do not include a decreasing delta torque request.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a flowchart illustrating exemplary steps that are executed by the torque control arbitration of the present disclosure; and FIG. 5 is a flowchart illustrating exemplary steps for arbitrating torque requestors within an arbitration domain in accordance with the torque arbitration control.

DETAILED DESCRIPTION

Figure 1:
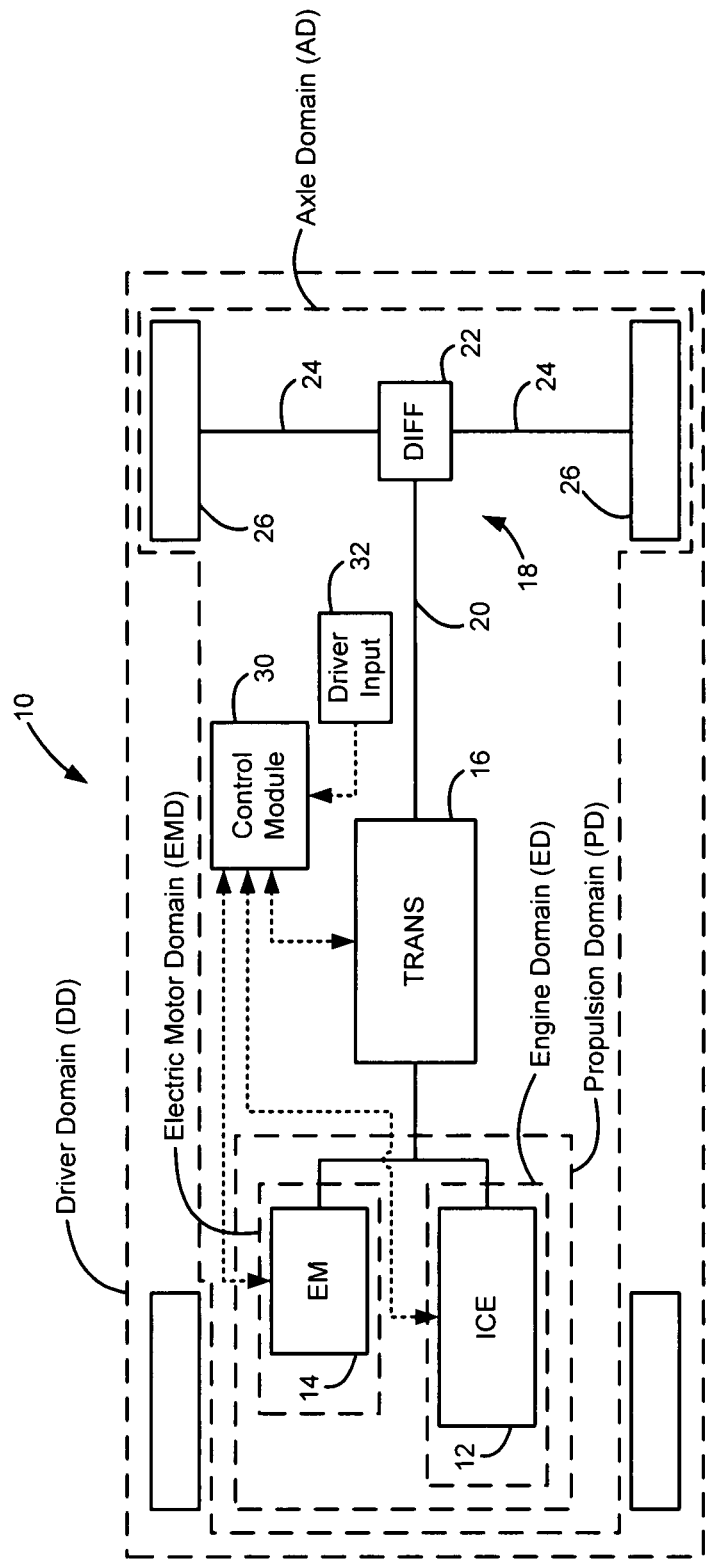
FIG. 1 is a functional block diagram of an exemplary powertrain system including exemplary arbitration domains processed in accordance with the torque control arbitration of the present disclosure.

The following description of the preferred embodiment is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary powertrain system 10 includes an internal combustion engine (ICE) 12 and an electric motor (EM) 14. The ICE 12 and EM 14 are torque sources and can each generate torque to drive a transmission 16. Accordingly, the ICE and EM are considered to be torque sources. The transmission 16 multiplies the torque output of the ICE 12 and/or EM 14 to drive a driveline 18. The driveline 18 includes a propeller shaft 20, a differential 22 and axle shafts 24 (e.g., halfshafts). The torque that is output from the transmission 16 is transferred through the propeller shaft 20, is multiplied by a final drive ratio in the differential 22 and is split between the axle shafts 24 to drive driven wheels 26.

The powertrain system 10 further includes a control module 30 that regulates operation of the torque sources (e.g., the ICE 12 and/or EM 14) based on the torque control arbitration of the present disclosure. A driver input 32 is provided and provides an input to the control module 30. The driver input 32 can include, but is not limited to, an accelerator pedal and/or a cruise control system.

Although the exemplary powertrain system is described as a rear-wheel drive (RWD) hybrid electric powertrain, it is appreciated that the torque arbitration of the present disclosure can be implemented in any powertrain configuration. For example, the torque arbitration control can be implemented in a powertrain having a single torque source (e.g., an ICE or an EM) and having a front-wheel drive (FWD), RWD, four-wheel drive (4WD) or all-wheel drive (AWD) configuration. As another example, the torque control arbitration can be implemented in a hybrid electric vehicle having an ICE and a plurality of electric motors (e.g., an electric motor operably located at each driven wheel).

The torque control arbitration of the present disclosure includes, but is not limited to, the following features: established torque arbitration domains, standard types of torque requests, validation and limitation of torque requests, arbitration of multiple torque requests within a domain, arbitration of torque requests when transitioning between domains, as well as accommodating delta torque requests. Each of these features is discussed in further detail below.

For a given powertrain system, a plurality of torque arbitration domains is established. An arbitration domain is an area within the powertrain torque flow path that a torque feature or torque features desire to control the torque. The arbitration domains include a global arbitration domain and subsequent arbitration domains that step down to a torque source domain or multiple torque source domains. The global arbitration domain is defined as the outermost arbitration domain and the torque source domain(s) is(are) defined as the innermost arbitration domain(s). The number of arbitration domains depends on the particular configuration of the powertrain system. The inner domains continue to move in the powertrain system with an arbitration domain at each point that a torque feature desires to control the torque. Exemplary torque features are discussed in further detail below.

Each torque feature generates a torque request, which include, but is not limited to, an absolute torque value, a minimum torque limit value, a maximum torque limit value or a delta torque value. The torque requests are sorted into the appropriate arbitration domain based on the point in the driveline that each desires to control a desired torque behavior. Sorting of the torque requests is discussed in further detail in commonly assigned U.S. Provisional Patent Application No. 60/959,967, filed on Jul. 16, 2007, now U.S. patent application Ser. No. 11/934,234, filed on Nov. 2, 2007, the disclosure of which is expressly incorporated herein by reference.

The exemplary powertrain system 10 of FIG. 1 includes a driver domain (DD), an axle torque domain (AD), a propulsion domain (PD), an engine domain (ED) and an electric motor domain (EMD). The arbitration domains work from the outside of the powertrain system to the inside of the powertrain system. For example, the DD is the global arbitration domain (i.e., the outermost arbitration domain) and the ED and EMD are both torque source domains (i.e., the innermost arbitration domains). The DD encompasses torque features including, but not limited to, the driver torque input (e.g., accelerator pedal and/or cruise control), which generate an absolute torque request. For example, a driver depresses the accelerator pedal indicating a corresponding amount of torque desired from the torque sources.

The AD is subsequent to the DD and includes the total output torque produced by the powertrain system at the axle shafts. An exemplary torque feature of the AD includes an axle protection torque feature, wherein an axle protection algorithm generates a maximum torque limit. The maximum torque limit indicates the maximum allowable torque through the axle in order to protect axle components (e.g., driveshafts, halfshafts).

The PD is subsequent to the AD and includes the total torque output of the torque sources, which drives the transmission input shaft. An exemplary torque feature of the PD includes a transmission protection algorithm that generates a maximum torque limit to limit the torque at the transmission input shaft. The maximum torque limit indicates the maximum allowable torque through the transmission input shaft in order to protect transmission components.

The ED and EMD are subsequent to the PD and include torque generated by the ICE and EM individually. An exemplary torque feature of the ED is an engine protection algorithm that generates a maximum torque limit to limit the torque generated by the engine. The maximum torque limit indicates the maximum allowable torque that is to be generated in order to protect engine components (e.g., piston rings, seals, valves and the like). Another exemplary torque feature of the ED is an engine stall prevention algorithm that generates a minimum torque limit. The minimum torque limit indicates the minimum amount of torque to be generated by the engine to prevent engine stall.

Other exemplary torque features of the powertrain system 10 include, but are not limited to, a vehicle stability control system, a traction control system, an engine overspeed protection system and the like.

All of the torque requests (TRs) generated by the torque features are confined to standard request types. The standard request types include an absolute torque value, a maximum torque limit, a minimum torque limit or a delta torque. In this manner, the overall powertrain system generates very few torque request types. Most powertrain systems can be managed with only the maximum and minimum torque limits.

Each of the torque requests is validated as being good and is limited to the capabilities of the powertrain system prior to arbitration. For example, a validation algorithm processes a TR and determines whether the TR is valid based on, for example, the current operating characteristics of the powertrain system. The TR is compared to maximum and minimum values (i.e., a range) and is limited based on these values. For example, if the TR is for 260 Nm of engine torque output, but the engine is only capable of 250 Nm, the TR is limited to 250 Nm.

Once all of the TRs have been validated and limited, the TRs are arbitrated within their respective domains. The arbitration starts with the outermost domain and works inward to the innermost domain(s). A simple rule set is implemented for arbitration within an arbitration domain. More specifically, the lowest maximum torque request ($T_{MAXLO}$) and the highest minimum torque request ($T_{MINHI}$) are identified. The TR value that is the output from the particular arbitration domain is the lower of $T_{MAXLO}$ and $T_{MINHI}$.

Once the single TR for an outer AD is determined, that TR is inserted into the TR set of the next inner domain and is arbitrated therewith. More specifically, when a transition is made from an outer to an inner domain, the outer domain TR is modified to be a minimum TR regardless of the request type that won arbitration in the outer domain. This is done at each transition between arbitration domains and enables a minimum TR in an inner domain to win arbitration over a maximum TR from an outer domain. When the powertrain splits along independent power flow paths, the arbitration splits into multiple arbitration paths, as discussed in further detail below.

Figure 2:
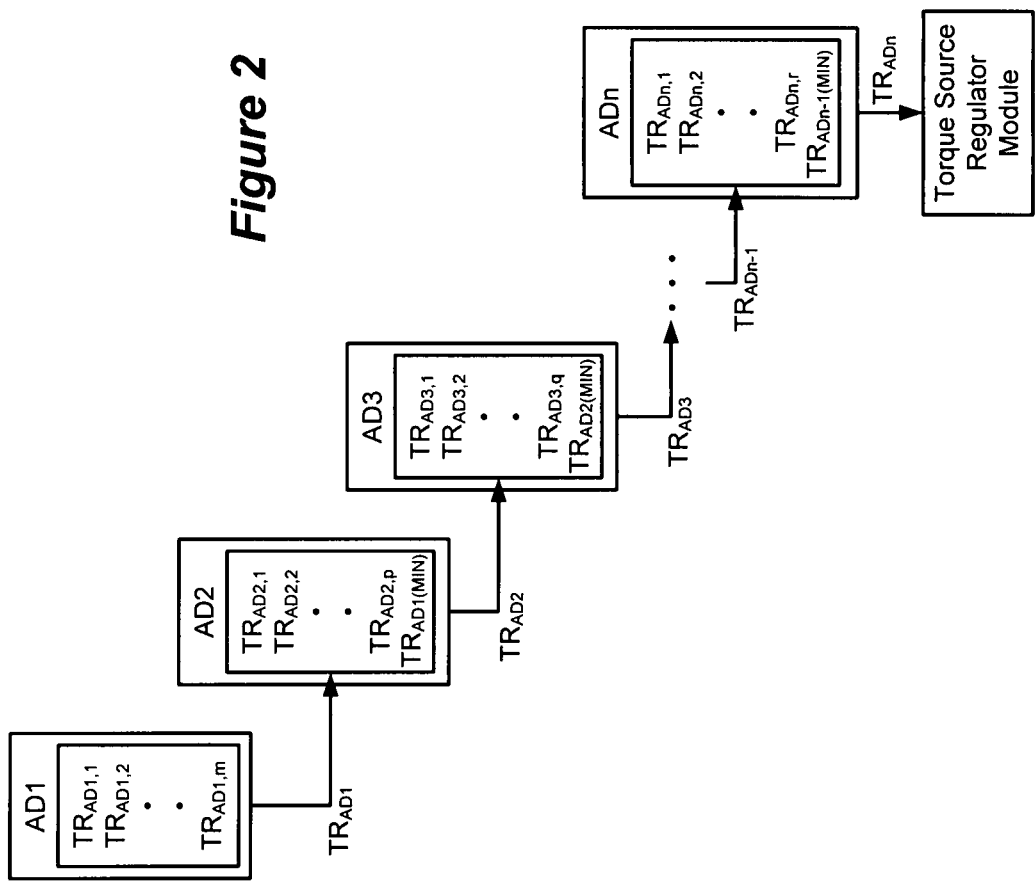
FIG. 2 is a diagram schematically illustrating exemplary modules that execute the torque control arbitration in accordance with the present disclosure.

Referring now to FIG. 2, exemplary modules that execute a general arbitration for n arbitration domains (ADs) will be described. The AD modules include AD1 to ADn. AD1 is the outermost AD (e.g., the DD) and ADn is the innermost or torque source AD. Each AD includes a plurality of TRs. For example, AD1 includes $TR_{AD1,1}$ to $TR_{AD1,m}$, AD2 includes $TR_{AD2,1}$ to $TR_{AD3,p}$, AD3 includes $TR_{AD3,1}$ to $TR_{AD3,q}$ and ADn includes $TR_{ADn,1}$ to $TR_{ADn,r}$. The torque control arbitration starts With AD1 and identifies the lowest maximum torque request and the highest minimum torque request from $TR_{AD1,1}$ to $TR_{AD1,m}$. The TR output from AD1 ($TR_{AD1}$) is the lower of the lowest maximum torque request and the highest minimum torque request. $TR_{AD1}$ is introduced into the TR set of AD2 and is set as a minimum TR ($TR_{AD1(MIN)}$). This arbitration process continues through to ADn. The arbitration within ADn outputs a final TR ($TR_{ADn}$), which a torque source regulation module uses to regulate the torque source.

Figure 3:
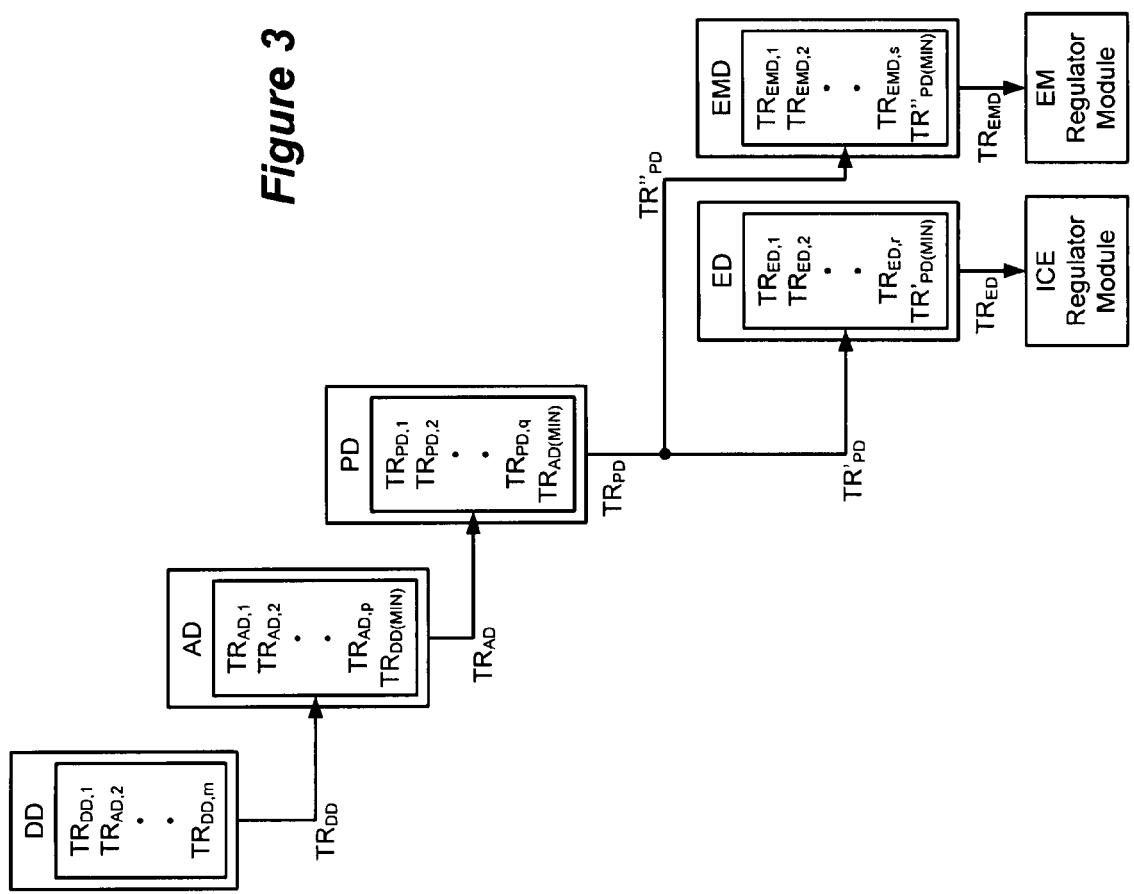
FIG. 3 is a diagram schematically illustrating exemplary modules that execute the torque control arbitration for the exemplary powertrain system of FIG. 1.

Referring now to FIG. 3, exemplary module that arbitrate torque requests for the powertrain system of FIG. 1 will be described in detail. The AD moduless include the DD, the AD, the PD, the ED and the EMD. The DD is the outermost AD and the ED and EMD are the innermost. The DD includes $TR_{DD,1}$ to $TR_{DD,m}$, the AD includes $TR_{AD,1}$ to $TR_{AD,p}$, the PD includes $TR_{PD,1}$ to $TR_{PD,q}$, the ED includes $TR_{ED,1}$ to $TR_{ED,r}$ and the EMD includes $TR_{EMD,1}$ to $TR_{EMD,s}$. The torque control arbitration starts with the DD and identifies the lowest maximum torque request and the highest minimum torque request from $TR_{DD,1}$ to $TR_{DD,m}$. The lower of the lowest maximum torque request and the highest minimum torque request is output as $TR_{DD}$.

The torque control arbitration moves to the AD. More specifically, $TR_{DD}$ is set as a minimum torque request ($TR_{DD(MIN)}$) and is arbitrated with the AD torque request set ($TR_{AD,1}$ to $TR_{AD,p}$). The lowest maximum torque request and the highest minimum torque request are identified from $TR_{AD,1}$ to $TR_{AD,p}$ and $TR_{DD(MIN)}$. The lower of the lowest maximum torque request and the highest minimum torque request is output as $TR_{AD}$. The torque control arbitration moves to the PD, where $TR_{AD}$ is set as a minimum torque request ($TR_{AD(MIN)}$) and is arbitrated with the PD torque request set ($TR_{PD,1}$ to $TR_{PD,q}$). The lowest maximum torque request and the highest minimum torque request are identified from $TR_{PD,1}$ to $TR_{PD,q}$ and $TR_{AD(MIN)}$. The lower of the lowest maximum torque request and the highest minimum torque request is output as $TR_{PD}$.

Because there are multiple torque sources, $TR_{PD}$ is split based on the percentage of the total torque that is generated by each of the torque sources. More specifically, an optimization algorithm determines the percentage of the total torque that is to be generated by the ICE 12 and the EM 14 and the torque arbitration control generates corresponding arbitration values ($TR'_{PD}$ and $TR''_{PD}$) based thereon. For example, if the optimization algorithm determines that the ICE 12 is to generate 100% of the torque, $TR'_{PD}$ is equal to $TR_{PD}$ and $TR''_{PD}$ is equal to zero. As another example, if the optimization algorithm determines that the ICE 12 is to generate 80% of the torque and the EM 14 is to generate 20% of the torque, $TR'_{PD}$ is equal to $0.80 \times TR_{PD}$ and $TR''_{PD}$ is equal to $0.20 \times TR_{PD}$.

$TR'_{PD}$ and $TR''_{PD}$ are set as minimum torque requests ($TR_{PD'(MIN)}$ and $TR''_{PD(MIN)}$, respectively) and are arbitrated with the ED and EMD torque request sets ($TR_{ED,1}$ to $TR_{ED,r}$ and $TR_{EMD,1}$ to $TR_{EMD,s}$, respectively). The arbitration occurs as described above for the other ADs. The ED arbitration provides an ED torque request ($TR_{ED}$) and the EMD arbitration provides an EMD torque request ($TR_{EMD}$). Operation of the ICE 12 is regulated by an ICE regulation module based on $TR_{ED}$ and operation of the EM 14 is regulated by an EM regulation module based on $TR_{EMD}$.

Referring now to FIG. 4, exemplary steps that are executed by the torque control arbitration will be described in detail. In step 400, control identifies the TRs in each arbitration domain. In step 402, control validates and limits each TR in each arbitration domain. Control sets i equal to 1 in step 404. In step 406, control arbitrates the TRs within ADi to provide a single torque request ($TR_{ADi}$) for ADi.

In step 408, control determines whether i is equal to n. If i is equal to n, ADi is the arbitration domain associated with the torque source and control continues in step 410. If i is not equal to n, control continues in step 412. In step 410, control regulates operation of the torque source based on $TR_{ADi}$ and control ends. In step 412, control sets $TR_{ADi}$ as a minimum TR. Control introduces $TR_{ADi}$ into the TR set of ADi+1 in step 414. In step 416, control increments i by 1 and continues in step 406.

It is appreciated that the steps described above are exemplary and can be modified based on the configuration of a particular powertrain system. For example, the exemplary steps can be modified to account for the arbitration path splits associated with powertrain systems having multiple torque sources. It is further anticipated that the arbitration implementation as described herein provides on example of many for implementing the arbitration rules. The specific implementation can vary and is mechanized by arbitrating each request in sequence into a composite request in accordance with the arbitration rules. This is done, for example, instead of identifying the lowest maximum and the highest minimum and then choosing the lowest. This enables easier software mechanization with the same system behavior.

Referring now to FIG. 5, exemplary steps executed by the torque control arbitration within an arbitration domain will be described in detail. In step 500, control determines $T_{MAXLO}$ for the TR set of the particular arbitration domain. In step 502, control determines $T_{MINHI}$ for the TR set of the particular arbitration domain. Control determines whether $T_{MAXLO}$ is greater than $T_{MINHI}$ in step 504. If $T_{MAXLO}$ is not greater than $T_{MINHI}$, control continues in step 506. If $T_{MAXLO}$ is greater than $T_{MINHI}$, control continues in step 508. In step 506, control forwards $T_{MAXLO}$ as $TR_{AD}$ and control ends. In step 508, control forwards $T_{MINHI}$ as $TR_{AD}$ and control ends.

The torque control arbitration can also account for delta torque requests or torque offsets in powertrain systems that implement such torque features. An exemplary torque feature that generates a delta torque request includes a brake protection algorithm. The delta torque request indicates a fixed amount, by which the torque output is to be incremented or decremented. If a particular arbitration domain includes torque features that generate delta torque requests, the rules for that arbitration domain are as follows:

1. Determine $T_{MAXLO}$.
2. Determine $T_{MINHI}$.
3. If there are decrementing delta torque request(s) in the arbitration domain, the forwarded TR is equal to the lower of the $T_{MAXLO}$ and $T_{MINHI}$ minus the largest decrementing delta torque request.
4. If there is no decrementing delta torque request in the arbitration domain, the forwarded TR is equal to the lower of $T_{MINHI}$ and $T_{MAXLO}$ plus the largest increasing delta torque request.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of regulating a torque output of a vehicle powertrain, comprising:
   generating a plurality of torque requests;
   associating each of said plurality of torque requests with one of a plurality of arbitration domains to form torque request sets associated with each of said plurality of arbitration domains;
   arbitrating a first torque request set within a first of said plurality of arbitration domains to provide a first torque request;
   introducing said first torque request into a second torque request set associated with a second of said plurality of arbitration domains;
   arbitrating said second torque request set within said second arbitration domain to provide a second torque request; and
   regulating a torque source based on said second torque request.

2. The method of claim 1 wherein said steps of arbitrating comprise:
   identifying a maximum torque request within an arbitration domain;
   identifying a minimum torque request within said arbitration domain; and
   setting a torque request output for said arbitration domain equal to the lower one of said maximum torque request and said minimum torque request.

3. The method of claim 1 wherein said step of introducing comprises setting said first torque request equal to a minimum torque request.

4. The method of claim 1 wherein said torque requests include at least one of an absolute torque, a minimum torque limit, a maximum torque limit and a delta torque, wherein said delta torque is a specified amount by which said torque output is adjusted.

5. The method of claim 1 wherein said steps of arbitrating comprise:
   identifying a maximum torque request within an arbitration domain;
   identifying a minimum torque request within said arbitration domain; and
   setting a torque request output for said arbitration domain equal to the lower one of said maximum torque request and said minimum torque request minus one of a plurality of delta torque requests when said torque requests include said plurality of delta torque requests, wherein each of said plurality of delta torque requests is a request to adjust said torque output by a specified amount.

6. The method of claim 5 wherein said one of said plurality of delta torque requests is a decreasing delta torque request and is the largest of said plurality of delta torque requests.

7. The method of claim 1 wherein said steps of arbitrating comprise:
   identifying a maximum torque request within an arbitration domain;
   identifying a minimum torque request within said arbitration domain; and
   setting a torque request output for said arbitration domain equal to the lower one of said minimum torque request and said maximum torque request plus one of a plurality of delta torque requests when said torque requests include said plurality of delta torque requests, wherein each of said plurality of delta torque requests is a request to adjust said torque output by a specified amount.

8. The method of claim 7 wherein said one of said plurality of delta torque requests is an increasing delta torque request and is the largest of said plurality of delta torque requests when said plurality of delta torque requests do not include a decreasing delta torque request.

9. An arbitration system for regulating a torque output of a vehicle powertrain, comprising:
   a control module that associates each of a plurality of torque requests with one of a plurality of arbitration domains to form torque request sets associated with each of said plurality of arbitration domains;
   a first module that arbitrates a first torque request set corresponding to a first of said plurality of arbitration domains to provide a first torque request and outputs said first torque request to a second module, wherein said second module introduces said first torque request into a second torque request set associated with a second of said plurality of arbitration domains, and wherein said second module arbitrates said second torque request set to provide a second torque request; and
   a third module that regulates a torque source based on said second torque request.

10. The arbitration system of claim 9 wherein said first and second modules arbitrate by identifying a maximum torque request of said corresponding first and second torque request sets, identifying a minimum torque request of said corresponding first and second torque request sets, and setting said corresponding first and second torque requests equal to the lower one of said maximum torque request and said minimum torque request.

11. The arbitration system of claim 9 wherein said second module sets said first torque request equal to a minimum torque request.

12. The arbitration system of claim 9 wherein said torque requests include at least one of an absolute torque, a minimum torque limit, a maximum torque limit and a delta torque, wherein said delta torque is a specified amount by which said torque output is adjusted.

13. The arbitration system of claim 9 wherein said first and second modules arbitrate by identifying a maximum torque request within an arbitration domain, identifying a minimum torque request within said arbitration domain, and setting a torque request output for said arbitration domain equal to the lower one of said maximum torque request and said minimum torque request minus one of a plurality of delta torque requests when said torque requests include said plurality of delta torque requests, wherein each of said plurality of delta torque requests is a request to adjust said torque output by a specified amount.

14. The arbitration system of claim 13 wherein said one of said plurality of delta torque requests is a decreasing delta torque request and is the largest of said plurality of delta torque requests.

15. The arbitration system of claim 9 wherein said first and second modules arbitrate by identifying a maximum torque request within an arbitration domain, identifying a minimum torque request within said arbitration domain, and setting a torque request output for said arbitration domain equal to the lower one of said minimum torque request and said maximum torque request plus a one of a plurality of delta torque requests when said torque requests include said plurality of delta torque requests, wherein each of said plurality of delta torque requests is a request to adjust said torque output by a specified amount.

16. The arbitration system of claim 15 wherein said one of said plurality of delta torque requests is an increasing delta torque request and is the largest of said plurality of delta torque requests when said plurality of delta torque requests do not include a decreasing delta torque request.

17. A method of regulating a torque output of a vehicle powertrain, comprising:
    generating a plurality of torque requests;
    validating each of said plurality of torque requests;
    limiting a torque request of said plurality of torque requests if it exceeds a limit value;
    associating each of said plurality of torque requests with one of a plurality of arbitration domains to form torque request sets associated with each of said plurality of arbitration domains;
    arbitrating a first torque request set within a first of said plurality of arbitration domains to provide a first torque request;
    introducing said first torque request into a second torque request set associated with a second of said plurality of arbitration domains;
    arbitrating said second torque request set within said second arbitration domain to provide a second torque request; and
    regulating a torque source based on said second torque request.

18. The method of claim 17 wherein said steps of arbitrating comprise:
    identifying a maximum torque request within an arbitration domain;
    identifying a minimum torque request within said arbitration domain; and
    setting a torque request output for said arbitration domain equal to the lower one of said maximum torque request and said minimum torque request.

19. The method of claim 17 wherein said step of introducing comprises setting said first torque request equal to a minimum torque request.

20. The method of claim 17 wherein said torque requests include at least one of an absolute torque, a minimum torque limit, a maximum torque limit and a delta torque, wherein said delta torque is an amount by which said torque output is adjusted.

21. The method of claim 17 wherein said steps of arbitrating comprise:
    identifying a maximum torque request within an arbitration domain;
    identifying a minimum torque request within said arbitration domain; and
    setting a torque request output for said arbitration domain equal to the lower one of said maximum torque request and said minimum torque request minus one of a plurality of delta torque requests when said torque requests include said plurality of delta torque requests, wherein each of said plurality of delta torque requests is a request to adjust said torque output by a specified amount.

22. The method of claim 21 wherein said one of said plurality of delta torque requests is a decreasing delta torque request and is the largest of said plurality of delta torque requests.

23. The method of claim 17 wherein said steps of arbitrating comprise:
    identifying a maximum torque request within an arbitration domain;
    identifying a minimum torque request within said arbitration domain; and
    setting a torque request output for said arbitration domain equal to the lower one of said minimum torque request and said maximum torque request plus one of a plurality of delta torque requests when said torque requests include said plurality of delta torque requests, wherein said each of said plurality of delta torque requests is a request to adjust said torque output by a specified amount.

24. The method of claim 23 wherein said one of said plurality of delta torque requests is an increasing delta torque request and is the largest of said plurality of delta torque requests when said plurality of delta torque requests do not include a decreasing delta torque request.

* * * * *